United States Patent
Valiulis

[19]

[11] Patent Number: 6,005,476
[45] Date of Patent: Dec. 21, 1999

[54] ELECTRONIC IDENTIFICATION, CONTROL, AND SECURITY SYSTEM FOR CONSUMER ELECTRONICS AND THE LIKE

[76] Inventor: Carl Valiulis, 1426 Harlem Blvd., Rockford, Ill. 61103

[21] Appl. No.: 09/122,599

[22] Filed: Jul. 24, 1998

[51] Int. Cl.$^6$ .................................................. H04B 1/00
[52] U.S. Cl. .............................. 340/310.01; 340/310.06; 340/310.08
[58] Field of Search .................. 340/310.01, 310.06, 340/310.08

[56] References Cited

U.S. PATENT DOCUMENTS

| | | | |
|---|---|---|---|
| 4,418,333 | 11/1983 | Schwarzbach et al. | 340/310.08 |
| 4,429,299 | 1/1984 | Kabat et al. | 340/310.01 |
| 4,567,557 | 1/1986 | Burns | 364/145 |
| 4,703,306 | 10/1987 | Barritt | 340/310.08 |
| 5,021,779 | 6/1991 | Bisak | 340/825.69 |
| 5,051,720 | 9/1991 | Kittirutsunetorn | 340/310 R |
| 5,334,975 | 8/1994 | Wachob et al. | 340/825.21 |
| 5,400,246 | 3/1995 | Wilson et al. | 364/146 |
| 5,428,342 | 6/1995 | Enoki et al. | 340/511 |
| 5,471,190 | 11/1995 | Zimmerman | 340/310.01 |
| 5,491,463 | 2/1996 | Sargeant et al. | 340/310.01 |
| 5,554,968 | 9/1996 | Lee | 340/310.01 |
| 5,570,085 | 10/1996 | Bertsch | 340/825.07 |
| 5,621,662 | 4/1997 | Humphries et al. | 364/550 |

FOREIGN PATENT DOCUMENTS 0 369 382 A2  5/1990  European Pat. Off. .

OTHER PUBLICATIONS

Article entitled "ID Tags Can Foil Shoplifters", Popular Mechanics, Jan. 1999 edition, p. 23.

*Primary Examiner*—Donnie L. Crosland
*Attorney, Agent, or Firm*—Leydig, Voit & Mayer,Ltd.

[57] ABSTRACT

An electronic identification, control, and security system comprises an electric power distribution network having a plurality of electric conductors and a plurality of electrical outlets providing electrical coupling, a controller electrically coupled to the distribution network through one of the electrical outlets, and an appliance electrically coupled to the distribution network through one of the electrical outlets. The appliance includes security and control logic, a communication interface coupled to the distribution network, and circuitry or software for disabling operation of the appliance. The controller transmits individualized information to the appliance via the distribution network independently of a physical location of the appliance. The controller may be a personal computer or a portable unit. The appliance includes a unique identification code stored therein, and the individualized information contains an address portion containing this unique identification code. The appliance also includes a security code stored therein. The security code must be transmitted to allow operation of the appliance.

24 Claims, 7 Drawing Sheets

ELECTRONIC IDENTIFICATION, CONTROL, AND SECURITY SYSTEM FOR CONSUMER ELECTRONICS AND THE LIKE

FIELD OF THE INVENTION

This invention relates to a system to remotely communicate with appliances and other consumer electronics, and more particularly to a system which allows remote communication, control, and security for consumer electronics via the electric power distribution network.

BACKGROUND OF THE INVENTION

Continued advances in the field of consumer electronics and appliances have added a significant number of features to these devices which makes their operation simpler, while at the same time increasing their overall functionality. Most pieces of consumer electronics and appliances manufactured today include some sort of computer control within the unit itself. These computers control everything from automatically remembering leap year and adjusting the number of days in February, to controlling the on-screen menu display, picture in picture control, cook cycle time control, to name just a few. While these microprocessors are controlling ever increasing functionality of the consumer electronic devices and appliances into which they are incorporated, their capacity for further increases remains vast. Even with these advanced features and computer control, modern manufacturing techniques have allowed the cost of these devices to decrease since their initial introduction onto the market. However, even with such decreases, the cost of these electronic devices and appliances still remains fairly expensive.

One feature with which most consumers have become quite accustomed is the ability to remotely control their TV, stereo, VCR, camcorder, etc. While several items of consumer electronics offer this remote control feature in a line-of-sight fashion with a hand held remote controller, the desire to electrically remotely control other appliances in a non-line-of-sight fashion also exists.

In order to fulfill this desire to allow remote control of home appliances, electronic equipment, lighting, etc., several systems have been developed which allow control communications over a home's electrical wiring system. However, since most home appliances and electronic equipment do not include communications and control circuitry to allow reception of the electrical system communication control signals, many of the systems which have been developed utilize separate plug-in modules which interface between an appliance's electrical cord and the home electrical outlet. While there is currently still no universally accepted standard for this communication over a home's electrical wiring system, two protocols have emerged as the forerunners, and serve as a basis for many of the systems currently designed. The first such protocol is commercially known and marketed as the X-10 communications protocol. The second communications protocol which appears to be in wide use at this time is known as the consumer electronics bus protocol (CEBus). However, as mentioned above, neither one of these two has gained universal acceptance in the design of remotely controllable systems for home consumer appliances, lighting, etc. Indeed, several systems which claim to allow remote control of home appliances, lighting, etc., utilize their own communications protocol which does not adhere to either one of the two aforementioned communication protocol forerunners.

Exemplary systems which claim to allow remote control of home appliances, lighting, etc., may be found with reference to the following documents: U.S. Pat. Nos. 4,567,557; 5,051,720; 5,334,975; 5,400,246; 5,471,190; 5,491,463; 5,554,968; 5,570,085; 5,621,662; and European Patent Application No. 89 121025.4 bearing Publication No. 0 369 382 A2. The disclosure of each of these documents, particularly as they relate to communications protocols allowing remote communications over an electrical distribution system, are hereby incorporated by reference.

While each of the above-identified systems claim certain benefits for a remotely controllable system, none of the systems are able to distinguish individual appliances within a household, other than by their physical or programmed location within the household. Specifically, many of the above systems utilize separate control modules which are plugged into the house's electrical outlets, and may be themselves remotely controlled via communication received over the electrical wiring system. However, if one were to unplug a particular appliance from one of these modules and move it to a different physical location within the house, the remote control system has no way of knowing that this has taken place without manual user interaction. While this reprogramming may seem to be a minor problem in view of the infrequency with which most consumer electronics and appliances are actually moved within a household, in view of the fact that many people have trouble reprogramming their VCR clock, it is a problem to be avoided nonetheless.

The unacceptability of this problem may be best highlighted through an example. Assuming, without admitting, that a remotely controlled system were capable of disabling a device, such as a television, at a certain time, if a parent were to disable a television set located in a child's room after 8:00 PM, a child would only have to unplug the television set from the current electrical receptacle and replug the television set into a different electrical receptacle in order to defeat the system programming and allow continued television viewing after 8:00 PM. While the parent could conceivably disable all of the electrical outlets to the child's room, such is undesirable as this would prevent the child from using a night light, clock radio alarm, etc. in his room. While this may appear to be a simplistic example, parents with kids who own video games may well disagree.

An additional problem with electronic appliances exists mainly due to their expense and ease of portability. This problem is the ease with which electronic appliances are stolen from homes, warehouses, and during transit. Because these devices are so enjoyable to own, and yet are priced out of the reach of many citizens, a significant market for stolen electronic appliances exists. Their ease of portability and lack of security features and identification, as well as the relativity high probability that the recipient of the stolen merchandise will not be caught, or if so not prosecuted, only exacerbates this problem. Currently, most consumer electronics devices only carry a written serial number on the device to identify it in the event of a theft. However, since many individuals fail to record or register this serial number, attempts to recover merchandise once it has been stolen is nearly impossible.

A device which attempts to overcome this problem is described in U.S. Pat. No. 5,021,779, issued to Bisak on Jun. 4, 1991 for a SECURITY DEVICE. The system contemplated by this patent utilizes a receiver-decoder which is adapted and arranged to allow the appliance to operate in its normal mode when the receiver-decoder receives a predetermined code carried via the electrical wiring system within the home. If this predetermined code is not received by the receiver-decoder, the appliance enters a security mode of operation. Various alternative security modes of operation are described in this patent including the use of an alarm within the device, trigger a transmitter device to sound an external alarm, or transmit a silent signal to the police department upon being plugged in to allow the apprehension of the thieves. The encoder-transmitter of this system is arranged to frequency or phase modulate a carrier signal with a binary digital code and transmit that signal over the electrical wiring system to the electronic appliance plugged into the wall socket of the household. Once a consumer has set a particular code and transmitted that code over the electrical system to the electronic appliance, that code is kept in memory and used to compare subsequent receptions to determine of the appliance is still connected within that consumer's household.

However, as with the above-described control systems, the system of the Bisak '779 patent does not allow for individual identification of electronic appliances coupled to the system. Nor does this system allow any type of control of the electronic devices coupled to the electrical system of house. Further, this security device operates on its own communications protocol operating at 260 kHz and transmitting a unique binary digital code which is suited only to the security feature.

SUMMARY OF THE INVENTION

It is therefore an object of the instant invention to overcome many of these and other problems existing in the art. More particularly, it is an object of the instant invention to provide an electronic system of identification, control, and security for use with electronic and electrical appliances. Additionally, it is an object of the instant invention to provide a system which is capable of individually identifying particular electronic components within a household regardless of the physical location of that device. It is a further object of the instant invention to provide a system which allows for individualized control of an uniquely identified electronic appliance within a household. Further, it is an object of the instant invention to provide a system which deters the theft of electronic devices from the household. Additionally, it is an object of the instant invention to provide a system which also deters the theft of these electronic devices while stored in a warehouse or while in transit.

In view of these objects, it is therefore a feature of the instant invention to provide a system which electronically uniquely identifies each electronic appliance manufactured and sold throughout the world. It is a further feature of the instant invention to utilize this unique electronic identification system in the control and security of these electronic appliances. Additionally, it is a feature of the instant invention to utilize electronic communication over the electrical wiring system of a residence to communicate the individual identities, control, and security codes generated by the system. It is a further feature of the instant invention to provide a factory preset security code which disables the electronic appliance during transit and storage until the electronic appliance is sold to a consumer.

In a preferred embodiment of the instant invention, an electronic identification, control, and security system comprises an electric power distribution network having a plurality of electric conductors and a plurality of electrical outlets providing electrical coupling thereto, a controller electrically coupled to the electric power distribution network through one of the electrical outlets, and an appliance electrically coupled to the electric power distribution network through one of the electrical outlets. Preferably, the appliance includes security and control logic, a communication interface interposed between the logic and the electric power distribution network, and circuitry or software for disabling operation of the appliance which is controlled by the logic. The controller transmits individualized information to the appliance via the electric power distribution network. This individualized information is independent of a physical location of the appliance.

In a preferred embodiment, the controller is a personal computer having a controller, a display, a user interface, and a communication module interposed between the controller and the electric power distribution network. Alternatively, the controller may be a portable unit having a microcontroller, a display, a user interface, and a communication interface interposed between the microcontroller and the electric power distribution network. Preferably, this portable unit further includes a personal computer interface port.

In such a system in accordance with the teachings of the instant invention, the appliance includes a unique identification code stored therein. The individualized information transmitted by the controller contains an address portion containing the unique identification code. This unique identification code may be set by a manufacturer of the appliance, and may be reset by the consumer.

Preferably, the appliance also includes a security code stored therein. In this case, the individualized information contains the security code to allow operation of the appliance. The controller may periodically transmit the individualized information containing the security code, in which case the security and control logic commands the circuitry or software of the appliance to disable its operation in the absence of receipt of the this individualized information after a predetermined time. Alternatively, the security and control logic commands the circuitry or software of the appliance to disable its operation in the absence of receipt of the individualized information containing the security code after a predetermined time from electric coupling to the electric power distribution network. As an alternative embodiment, the security and control logic commands the circuitry or software to enable operation of the appliance upon receipt of the individualized information containing the security code.

In a preferred embodiment of the instant invention, the individualized information contains a control portion, and the logic is responsive to this control portion to control operation of the appliance. The controller generates this control portion in response to user commands, or alternatively in response to a user defined operational program.

In accordance with the teachings of the instant invention, an appliance for use in an electronic identification, control, and security system comprises an electric power connector adapted to couple the appliance to the electric power distribution network via an electrical outlet, security and control logic, a communication interface interposed between the logic and the electric power connector, and circuitry or software for enabling and disabling operation of the appliance. Preferably, the circuitry or software is controlled by the logic. This appliance preferably further comprises a unique identification code stored therein. Using this, the logic responds only to messages containing the unique identification code. Additionally or alternatively, the appliance further comprises a security code stored therein. The logic then may command the circuitry or software to enable operation of the appliance upon receipt of the security code. The logic also commands the circuitry or software to disable operation of the appliance after a predetermined time from last receipt of the security code.

A portable controller for use in this electronic identification, control, and security system preferably comprises an electric power connector adapted to couple the controller to the electric power distribution network via an electrical outlet, a microcontroller, a memory storage device, a display, a user interface, and a communication interface interposed between the microcontroller and the electric power connector. The microcontroller generates individualized information for transmission by the communication interface to the appliance via the electric power distribution network. Additionally, this portable controller may further comprise a computer interface port.

In accordance with an embodiment of the instant invention, the microcontroller generates security code information for transmission by the communication interface to the appliance via the electric power distribution network in response to user input from the user interface. The microcontroller periodically generates this security code information for transmission by the communication interface to the appliance via the electric power distribution network. Preferably, the appliance includes an unique identification code. The portable controller stores this unique identification code in the memory storage device and includes it in the individualized information.

Further in accordance with the teachings of the instant invention and for use in association with an appliance in an electronic identification, control, and security system, an adapter comprises security and control logic, a communication interface electrically coupled to the logic and the electric power distribution network, and circuitry or software for enabling and disabling operation of the appliance. This circuitry or software is controlled by the logic and electrically interposed between the outlet and the electric power connector of the appliance.

These and other aims, objectives, and advantages of the invention, will become more apparent from the following detailed detailed description while taken into conjunction with the accompanying drawings.

Figure 1:
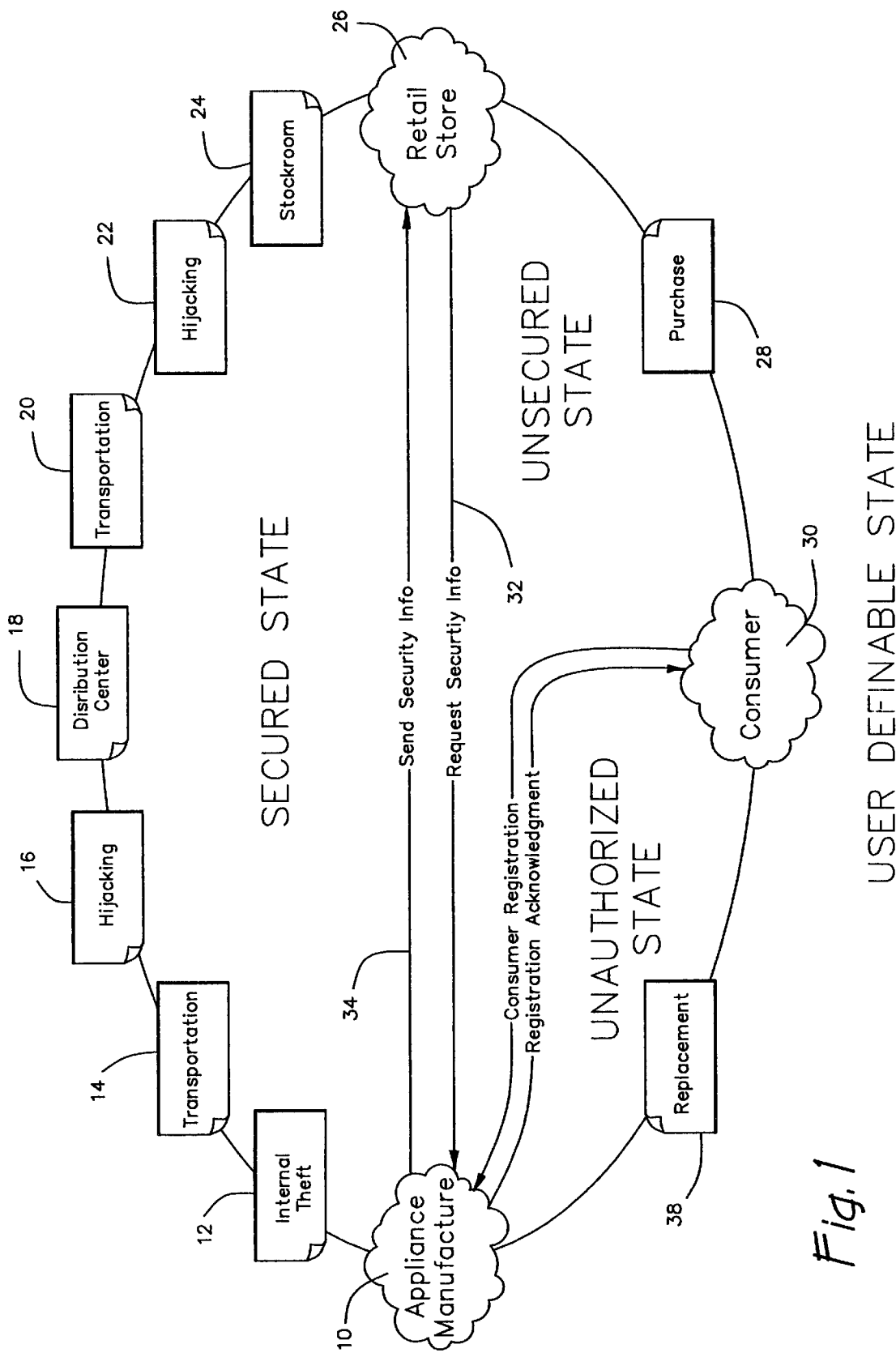
FIG. 1 is a system level state diagram functionally illustrating aspects of the instant invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 illustrates the functional operation of a system in accordance with an embodiment of the instant invention in state diagrammatic form. In accordance with the teachings of the instant invention, an appliance manufacturer 10 manufactures an appliance having some form of functional electronics incorporated therein. During the manufacturing process, the appliance manufacturer 10 individually secures the appliance, as will be described more fully hereinbelow, to preclude any internal theft 12 of the appliance. Once the manufacturing process is complete, the appliance is transported 14 through the mails, via a common carrier such as a trucking company, a shipping company, or a train. Since the appliance is shipped from the appliance manufacturer 10 in a secured state, highjacking 16 of the appliance during transportation is no longer viable since a highjacked appliance cannot be operated, and therefore has an extremely low black market fence value. The secured appliance, therefore, will arrive at a distribution center 18 still in a secured state. From the distribution center 18, the appliance is then transported 20 to the various retail stores 26. Also during this phase of transportation 20, the highjacking 22 of the appliance is equally disadvantageous due to the secured state of the appliance. Having arrived safely, the appliance may be stored in a stock room 24 until it is sold at the retail store 26.

In one embodiment of the instant invention, the retail store 26, upon successfully negotiating a purchase 28 with a consumer 30, requests security information 32 from the appliance manufacturer 10. In response, the appliance manufacturer 10 sends security information 34 to the retail store 26 to allow the appliance to be placed in an unsecured state at the time of purchase 28. Alternatively, the security information may be provided to the consumer either directly from the manufacturer 10 or through the retail store 26. In one embodiment, the appliance is provided with a fixed password which is provided to the consumer 30 to allow operation of the appliance.

Upon returning home with the purchased appliance, the consumer 30 may then secure the appliance as will be described more fully hereinbelow. Additionally, the consumer 30 may also register 36 the appliance with the appliance manufacturer, receiving a registration acknowledgement in response, to allow warranty claims and replacement 38 of appliance components in the future. These warranty claims and replacements 38 are indicated in FIG. 1 as being an unauthorized state which may actually be either (1) unsecured, or (2) set with a manufacturer password or a password which is communicated to the manufacturer to allow operational testing and repair of the appliance.

In the hands of the consumer 30, the appliance is in a user definable state. The user, in accordance with the teachings of the instant invention, may choose to secure the appliance from future theft, or may choose to leave the appliance in an unsecured state by simply failing to set the security feature within the unsecured appliance. The method for setting the security feature within the appliance, as well as the system used to provide this security, will be described more fully hereinbelow.

Figure 2:
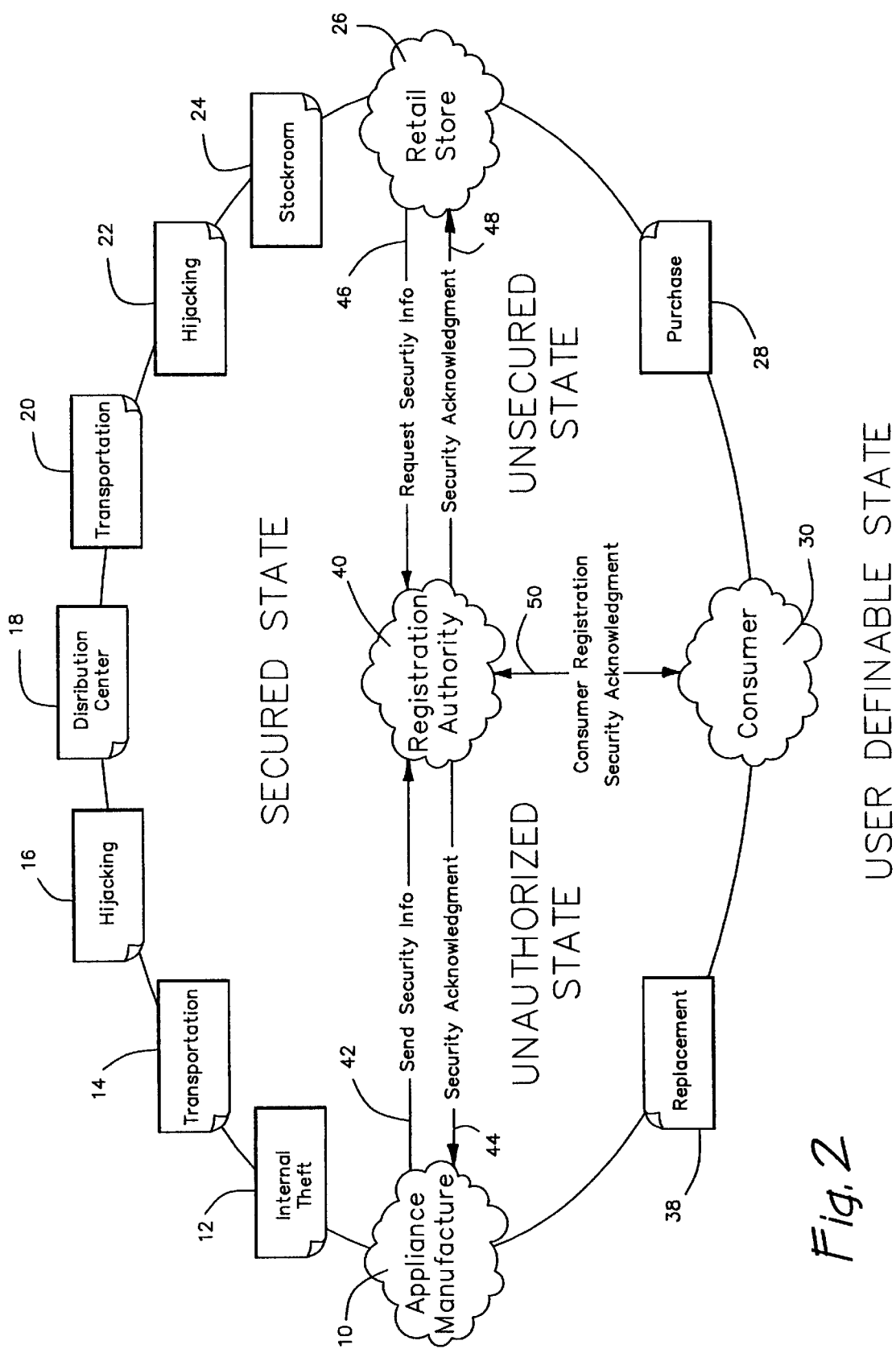
FIG. 2 is a system level state diagram illustrating system level states in an alternate embodiment of the instant invention.

In an alternate embodiment of the instant invention, as illustrated in FIG. 2, a central or distributed registration authority 40 is included within the system to provide central security and database tracking of security information for manufactured appliances to aid in the security, authentication, and theft recovery of consumer appliances. In this embodiment of the instant invention, the appliance manufacturer first sends security information for each of the appliances manufactured and secured therein to the registration authority. The registration authority 40 stores this security information for each manufactured appliance for later coordination and retrieval, and sends a security acknowledgement 44 to the appliance manufacturer 10. This indicates that the registration authority has successfully registered the secured appliance.

With this central authority 40, the retail store 26 no longer needs to communicate directly with the appliance manufacturer 10, but instead may request security information 46 directly from the registration authority 40 upon the negotiation of a purchase 28 with a consumer 30 of the secured appliance. In response, the registration authority 40 transmits 48 the security acknowledgment to the retail store 26 so that the appliance may be placed in the unsecured state, allowing the consumer 30 to later operate the appliance. Once in the hands of the consumer 30 the appliance is now in a user definable state wherein the user may, as described above, either choose to secure the appliance, or leave it in an unsecured state. Should the consumer decide to place the appliance in a secured state, he may do so without further required interaction with any other party. Alternatively, he may secure the device through a consumer registration communication 50 with the registration authority similarly as described above. Once the consumer registration information has been stored by the registration authority 40, a security acknowledgement 50, which may be a password, is transmitted to the consumer 30 via voice or modem communication. This password may then be utilized in one embodiment of the instant invention to unlock the consumer's ability to set his or her own password via the voice or modem communication. Security for this information transfer may be provided through any available means of encryption as appropriate.

Figure 3:
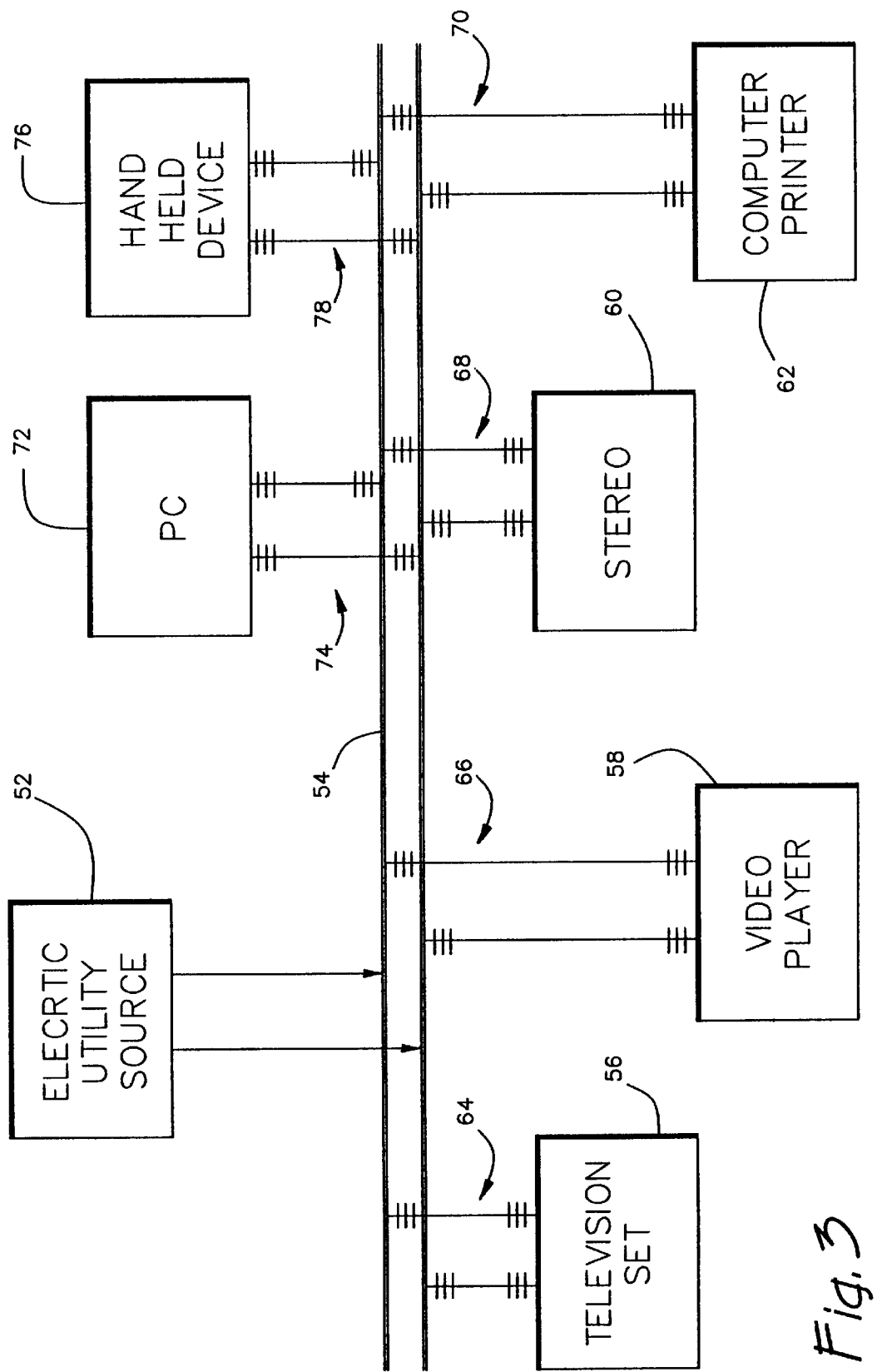
FIG. 3 is a system level single line block diagram constructed in accordance with an embodiment of the instant invention.

The securing of the appliance once in the possession of the consumer is accomplished once the appliance has been plugged in to the electrical distribution network in the home or office of the consumer, as illustrated in simplified block diagrammatic single line form in FIG. 3. As illustrated in this figure, the electric utility source 52 supplies electric power to the power distribution network 54 for electric power distribution throughout the home. This distribution network 54 comprises the wiring and electrical outlets, as well as the circuit breakers and switches commonly used in a home, office, or other consumer location. As the individual appliances, illustrated as a television set 56, a video player 58, a stereo 60, and a computer printer 62, are plugged into the distribution network 54 via their individual power cords (64, 66, 68, and 70 respectively), they receive electric power for operation, and are also now capable of individually receiving the security information to place them into a secured state. This security information is communicated to the individual appliances via the electric power distribution network 54 through a conventional electric power distribution communications protocol, such as X-10 CEBus, or other appropriate communications protocol. Preferably, the communication and coordination of the security information is contained within a consumer's personal computer 72 which is also plugged into the electric power distribution network 54 by power cord 74. Alternatively, or additionally, the security information may be communicated to the appliances via a portable hand held device 76 which is plugged into the electrical system via a common electrical outlet by power and communication cord 78. While FIG. 3 illustrates the use of both a personal computer 72 as well as a hand held device 76, one skilled in the art will recognize that the use of both of these is not required as much of their functionality in this context is duplicative. However, for enhanced security of the appliances, including the personal computer 72, the hand held device 76 may be utilized.

Figure 4:
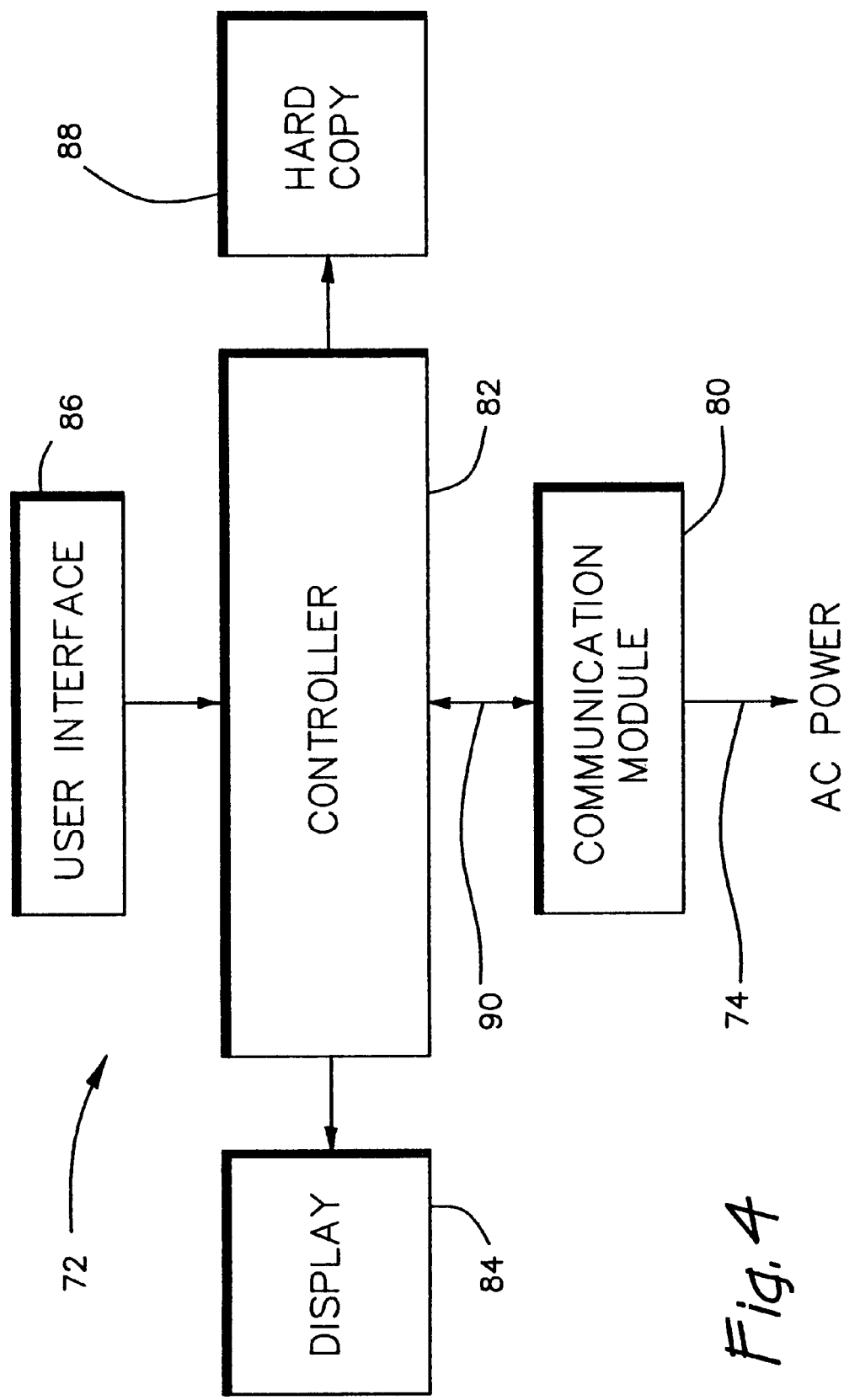
FIG. 4 is a simplified component block diagram in accordance with an aspect of the instant invention.

When the personal computer 72 is utilized to transmit security information over the electrical power distribution network 54, it preferably includes a communications module 80 which is coupled to the electric power cord 74 as illustrated in block diagrammatic form in FIG. 4. As may be seen from this simplified block diagram, the communications module 80 interfaces directly with the main controller 82 of the PC 72. In conventional manner, the PC 72 typically includes a display device 84, a keyboard or other user interface 86, the capability of printing a hard copy 88 when desired. The communication module 80 may vary depending upon the particular electric power system communications protocol chosen and may be, in a preferred embodiment, an X-10 CM11A which includes an RS-232 serial port 90 as its communications interface with the controller 82. Obviously, a different communication module 80 may be needed if a different communication protocol were chosen.

Figure 5:
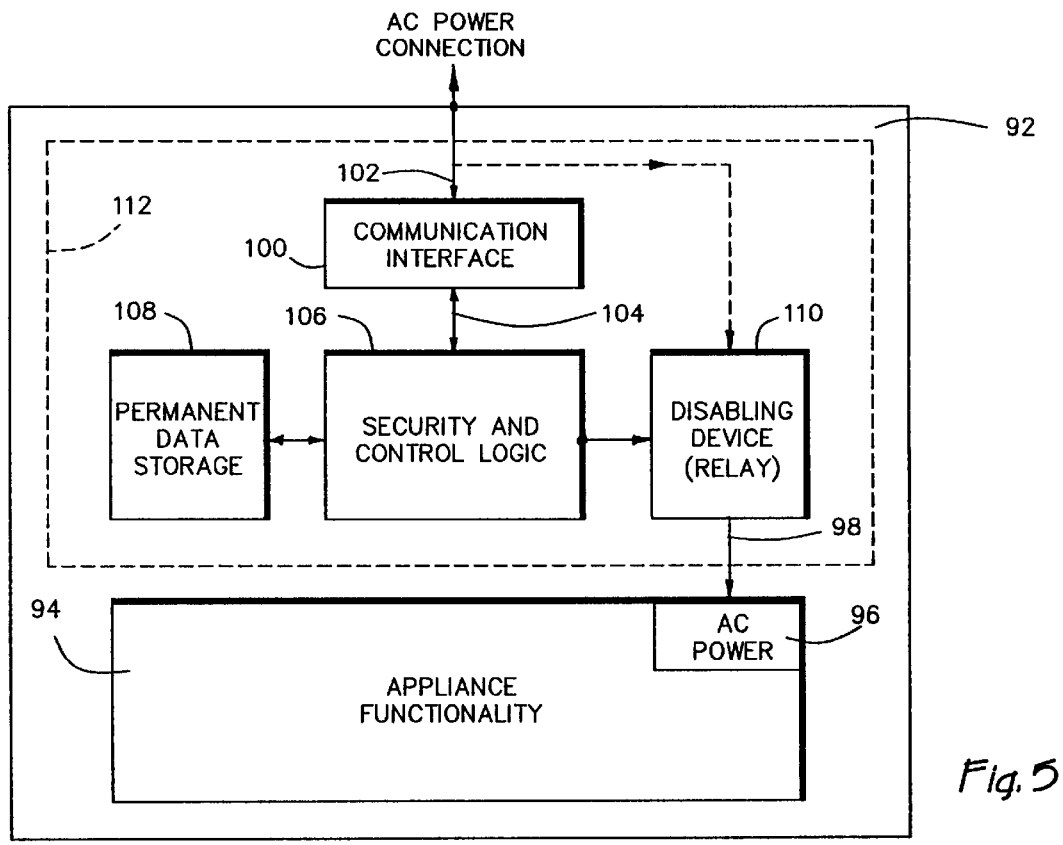
FIG. 5 is a simplified component block diagram illustrating a further aspect of the instant invention.

With respect to the appliances, FIG. 5 illustrates a simplified block diagram of an exemplary appliance constructed in accordance with the teachings of the instant invention. This exemplary appliance 92 contains internal electronics 94 which produce the appliance functionality, and which include a power supply section 96 which conditions the electric power from the AC power connection 98 for use by the control electronics 94. In the embodiment illustrated in FIG. 5, the communication interface 100, which may be preferably an X-10 CM11A communications module, interfaces directly with the AC power connection 102 which is coupled to the electric power distribution network (not shown). The communication interface module 100 preferably communicates via an RS-232 serial port 104 with the security and control logic module 106, which may be a PIC16C73 microprocessor, or other appropriate processing means.

The security and control logic 106 exchanges data with a permanent data storage device 108 which contains, for example, the unique appliance identification, the security code set by the system, etc. The security and control logic 106 also coordinates the operation of a disabling device 110 which is preferably interposed between the electric power connection 102 to the electric power distribution network (not shown) and the connection of electric power 98 to the power module 96 of the appliance 92. In this way, the power to the appliance electronics 94 may be commanded on or off by the security and control logic 106 in response to communications transmitted over the electric power distribution network and received by the communication interface 100. While FIG. 5 illustrates the communication and control element 112 as internal to the appliance 92, one skilled in the art will recognize that such a communications element 112 may be externally mounted from the appliance 92 as an adapter. This will allow for increased applicability of the system of the instant invention to existing appliances which do not have, or were not designed for internal communications and control mounting of element 112. In such an embodiment, the communication and control element 112 would form an adapter and could simply be interposed between the electrical wall outlet and the end of the power cord for the appliance.

Figure 6:
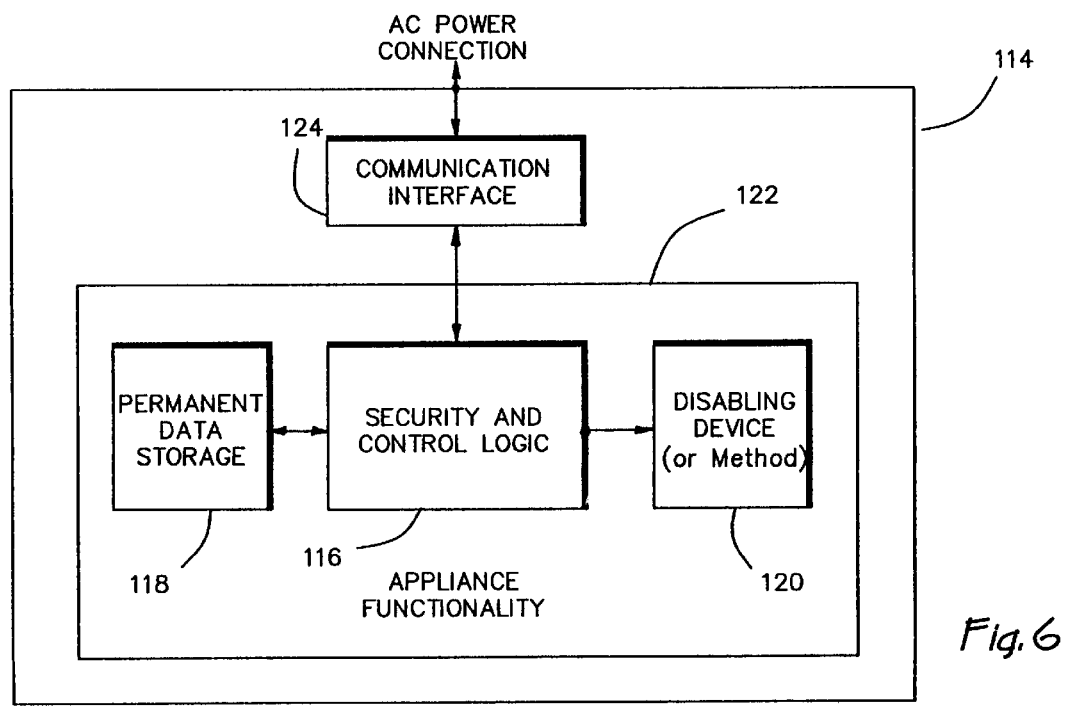
FIG. 6 is a simplified component block diagram illustrating an alternate aspect of the instant invention.

An alternate embodiment of an appliance 114 suitable for use with, and incorporating the teachings of the instant invention is illustrated in FIG. 6. In this embodiment, the appliance 114 incorporates the security and control logic functionality 116, the permanent data storage elements 118, and the disabling device or method 120 within the appliance functionality electronics 122. Preferably, the communication interface 124 is still a separate module allowing for the interchangeability with different communications protocols depending upon a consumer's preferences for his internal electric power distribution network communications system. In this embodiment, the disabling device or method 120 performs the functionality of disabling the appliance when commanded to do so, or in response to the security features of the system. This functionality may be performed electronically within the microprocessor functionality control by disabling processor operation, or may be a disabling type relay used in conjunction with the power supply for the appliance. If this second option is employed, the relay should be installed such that stored parameters and presets within the appliances are not reset. Other implementations of the disabling functionality of element 120 may be utilized as appropriate, and it is the intent of this application to cover all such implementations.

Figure 7:
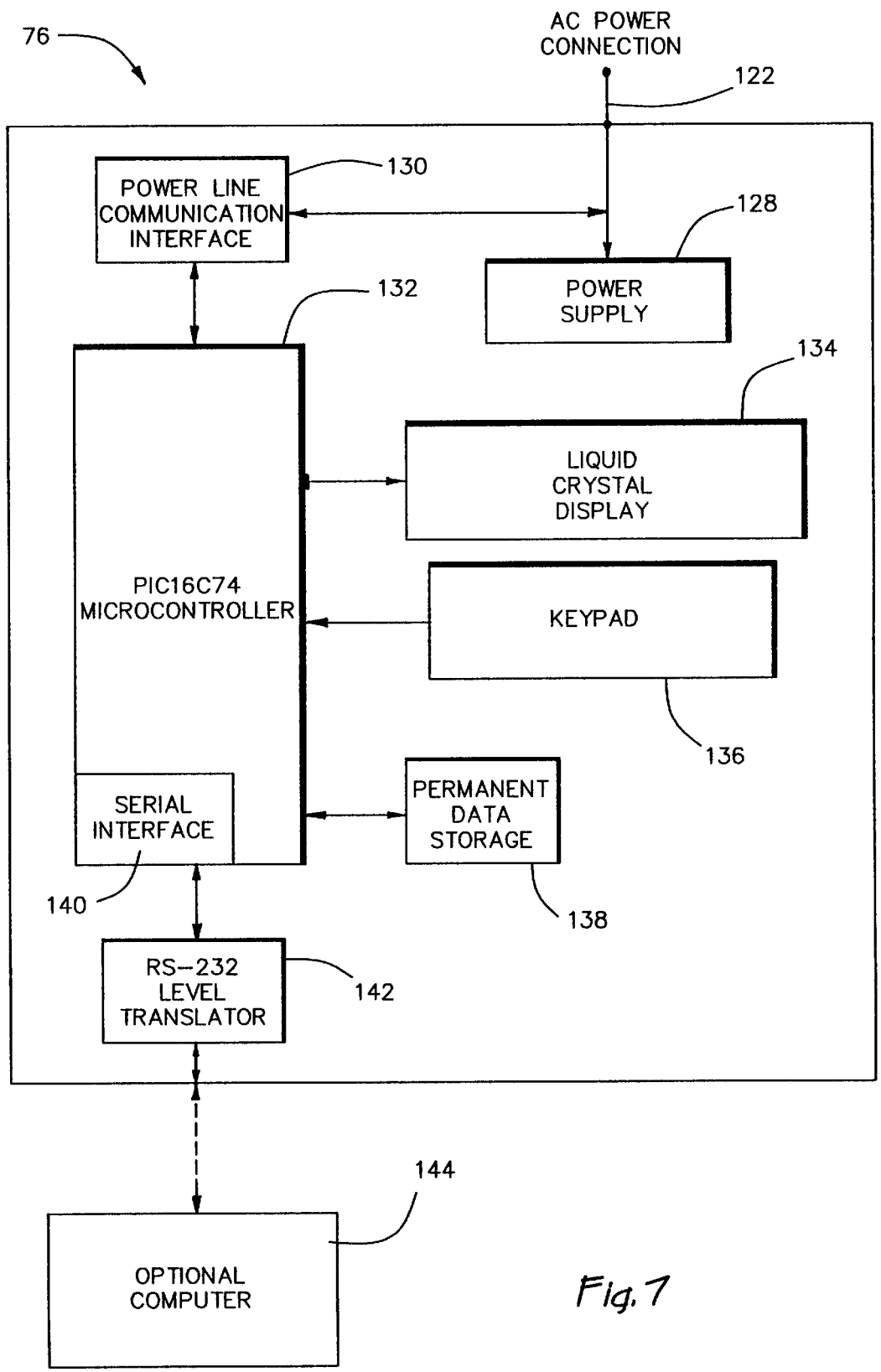
FIG. 7 is a simplified block diagrammatic illustration of a portable control unit in accordance of the teachings of the instant invention.

As described above, this system may also operate with a portable hand held unit 76, a simplified block diagram of which appears in FIG. 7. As may be seen from this figure, the hand held unit 76 includes an AC power connection 126 which is plugged into the standard wall outlet of the electric power distribution network (not shown). The AC power coupled by this connector 126 is used conventionally by an internal power supply 128, and also is connected to the power line communication interface module 130. This power line communication interface module 130 may be of the type described above, or may be a universal communications protocol unit which allows for electronic communication over the electric power distribution network using multiple communications protocols. Preferably, however, this power line communication interface module 130 communicates via the X-10 communications protocol.

The power line communication interface 130 communicates with and is controlled by a microcontroller 132, which may be preferably a PIC16C74 microcontroller. This microcontroller 132 coordinates the control and security functions of the system, and transmits and receives the required information over the electric power distribution network as described above. The hand held unit 76 also includes a display, such as liquid crystal display 134, to allow display of required information to the user. Additionally, a user keypad 136 or other user interface is included to allow consumer input to the microcontroller 132. The microcontroller 132 also interfaces with a permanent data storage module 138 which is used to store the security and identification information of the coupled appliances installed within the system.

While not required, the hand held unit 76 may preferably utilize the serial interface 140 of the microcontroller 132 to provide communication with, for example, a user's personal computer 144. Preferably, the serial interface 140 will utilize an RS-232 level translator 142 to provide adequate signal level communication with the user's personal computer. Alternatively, the translator 142 may be replaced with a modem to provide remote communications via a telephone line. In either case, the hand held unit 76 may "dump" collected and stored data on appliance power usage, operating states, etc. To collect this data, the hand held unit is plugged into a wall socket for a period of time to allow it to communicate with and store data from the appliances coupled to the system.

Figure 8:
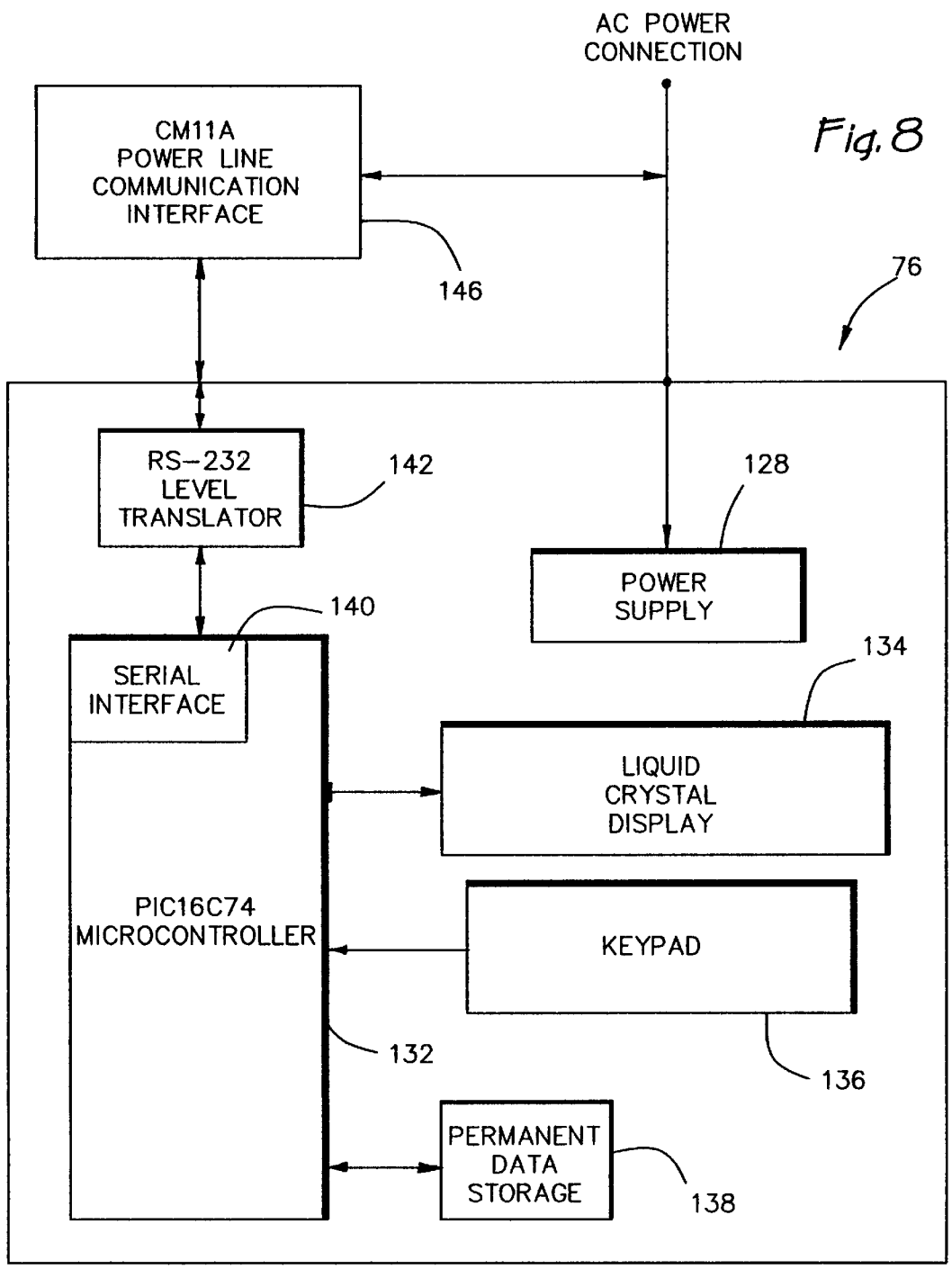
FIG. 8 is a simplified block diagrammatic illustration of an alternate embodiment of a portable control unit in accordance with the teachings of the instant invention.

An alternate embodiment of the portable unit 76 of the instant invention is illustrated in block diagrammatic form in FIG. 8. In this embodiment, the power line communication interface module 146 is an external device which, through replacement, allows the unit 76 to be utilized with multiple communication protocols. This communication interface 146 may be a plug-in module or card which plugs into the unit 76, or may be a separate module which is interposed between the AC power connection and the input to the unit 76 itself In a preferred embodiment of the instant invention, the communication interface module 146 is an X-10 CM11A power line communication interface module. In this configuration of the hand held unit 76, the serial interface 140 of the microcontroller 132 is utilized for the communication with the communication interface module 146. Preferably, an RS-232 level translator 142 is utilized for this function.

Having undertaken a description of the hardware system components in the electronic identification, control, and security system of the instant invention, the description now turns to the system functionality implemented thereby. As the system has many aspects and broad functionality, the following description will attempt to present a logical progression of the use of the system from original manufacture through purchase, installation, control, and attempted theft.

As described above with reference to FIGS. 1 and 2, the security feature of the instant invention may preferably first be set by the appliance manufacturer to prevent internal theft, or theft during the transportation and final distribution to the retail outlet. This would be accomplished by the appliance manufacturer setting the internal security code to disable the appliance from operation. The unit would then be in the secured state, requiring that the security code be input to unlock the device and allow operation thereof. In one embodiment of the instant invention, a separate lock and unlock security code could be implemented to control the security of the appliance. Preferably however, the system would utilize a watch dog timer type arrangement whereby periodic reception of the required security code would be needed to maintain the appliance in an operational mode. That is to say, the appliance would continually or periodically look for the security code to be received from the electrical power distribution network to ensure its continued existence at a particular consumer location. If the appliance were not to receive the security code within its timeout period, it would automatically enter a non-operational security state, precluding further operation of the appliance until such time as its security register were reset, or otherwise were to receive the proper security code. In this way, theft of the appliance would be discouraged, because operation of the appliance would be prevented without knowing the security code with which that particular appliance had been programmed.

Once purchased by consumer, the retail store could either reset the security register such that the appliance would be in an unsecured state allowing operation of the appliance without the need for transmission of a security code signal, or the retail store could provide the consumer with the preset security code to allow operation of the appliance in their home by utilizing the system of the instant invention. With the system of the instant invention, the consumer may set the security code to a common code for all appliances owned by that particular consumer encoupled to his electric power distribution network. This would be accomplished either through the hand held unit described above or through the personal computer interface also described above.

In an embodiment of the instant invention whereby a personal computer is utilized to coordinate the security features of the instant invention, the personal computer preferably periodically transmits the security code over the electric power distribution network to maintain all appliances coupled thereto in an operational state. However, as this embodiment requires that the personal computer continuously, periodically transmit information over the electric power distribution network, the system may alternately utilize a security set mode whereby an appliance would be enabled via transmission of the security code, and would continue to operate normally until the unit is unplugged from the electric power distribution network, or electric power is otherwise removed therefrom. Once electric power has been removed and reapplied to the appliance, the system would function to preclude operation of the appliance until reception of the security code as previously set by the system. This would preclude theft of the device by locking out further functionality of the appliance once it has been unplugged and removed from the residence of the consumer. In this embodiment, the system would include a power delay timeout which prevents the lock out from operating for a given period, e.g., 15 seconds, following the loss of power. This power delay timeout prevents the necessity of initiating a password reset due to a power transient. This type of functionality is particularly desirable when the system is operated with the hand held unit described above. In this way, the hand held unit need only be utilized initially upon installation of the appliance, and after each power loss to the appliance.

To prevent the compromise of a single security code jeopardizing the security of all appliances either manufactured by an appliance manufacturer or installed within a consumer location, the system of the instant invention also contemplates the ability to set individual security codes for individual appliances. This is accomplished in the instant invention through the use of an individualized identification code stored within or otherwise associated with individual appliances. In this way, a matrix would be established within the system to associate each individual appliance with its particular security code. Advantageously, the use of this individualized appliance identification code also allows for individualized control of the appliances via the communication network over the electric power distribution system at the consumer location. As described above, the individualized addressed message would be ignored by all other appliances coupled to the electric power distribution network, and would only be acted upon by the particular appliance to which the message was directed.

While the particular format of the individualized identification information for each appliance may take any suitable form which allows for individual identification and addressing of the appliance, a preferred format will be described hereinbelow. Specifically, a preferred implementation of the electronic identification information takes the form of a twenty byte word. Preferably the word is segmented to allow for five bytes for UPC information identifying the make, model, etc. of the appliance, four bytes to identify the manufacture date, one byte to identify the shut down current threshold information to allow the system of the instant invention to coordinate control and load shed operations which will be described more fully hereinbelow, five bytes for the security code, and an additional five bytes for the lot number of the appliance. While not all of this information is required to allow the aforementioned security functionality of the system, it is included for enhanced control features as will be described below.

Through the use of the individualized identification of the various appliances installed in a consumer location, the system of the instant invention may be utilized to coordinate the functionality of these appliances through the centralized communication and control provided by the system. Control of the individual components may be coordinated through the consumer's personal computer 72 (see FIG. 3), or may alternatively be coordinated through the hand held device 76. Using either implementation, the consumer would access the system of the instant invention, selecting the appliance ID, and performing the desired control functions thereon. For example, the consumer may set hours of operation for individual appliances so that they may be used only during certain hours of the day. This programming would be maintained even if the particular appliance were removed from its current physical location within the consumer residence and moved to an alternate location. Regardless of that particular appliance's physical location within the consumer's residence, at the appointed hour the system would transmit an individualized addressed message disabling the appliance from further operation until the appointed hour for its reenablement. In addition to coordinated programming of the operation of various appliances, the system may be utilized to control the operation of the various appliances at that is particular time. As will be recognized by one skilled in the art, such coordinated control of individual appliances through a personal computer would also allow for remote control of these appliances through external modem communications with the personal computer 72.

The system of the instant invention may also be utilized to maintain performance information concerning each of the individual appliances utilized in the consumer location. Particularly, the operational status of each of the appliances may be monitored by the system of the instant invention through information transmitted from each of the individual appliances over the electrical distribution network to the central control of the system. The system would then record the operational status of each appliance, as well as any other information transmitted therefrom, in a database to allow coordination for, for example, built in test information, failure information, and warranty information.

Additional operational information may be included in the functionality of the individual appliances, encoded with the device ID information of the instant invention, and transmitted over the electric power distribution network in accordance with the teachings of the instant invention. Specifically, the actual power usage as a function of time, average power usage, total amp-hour usage may all be monitored. Furthermore, because the threshold states for on/off/failure as recommended by the manufacturer may be stored by the system, this power monitoring may be used to prompt users to take certain actions, e.g., a high refrigerator current draw may signal the system to prompt the user to clean the refrigerator coils or seek service. The system may also utilize this information to automatically turn off an appliance if the recommended maximum power utilization levels are exceeded. If an appliance is turned off in this manner, it may be re-enabled without the requirement of a password (non-secure re-energization) with or without a description of the reason why it turned off.

One of the significant advantages of the individual identification information of the instant invention is that system control functionality accommodated by various electric power distribution network communication protocols such as X-10 and CEBus may be advantageously used without the need for reprogramming upon physical movement of appliances within a consumer location. As an example, without individual identification of the consumer appliances, the physical movement of a particular appliance from one electrical outlet to another necessitates the reprogramming of the system to recognize the appliance's new physical location. With the system of the instant invention, this is no longer a problem as the individual appliance is addressed by individual ID as opposed to by physical location as with other systems. Therefore, the user is not tied to a particular configuration, but may freely rearrange the physical location of devices within the consumer location without having to repeat a time consuming process of programming the entire centralized control system in response.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure and implementation of the various components described above can be varied substantially without departing from the spirit of the invention, and exclusive use of all modifications that come within the scope of the appended claims is reserved.

What is claimed is:

1. An electronic identification, control, and security system, comprising:
    an electric power distribution network having a plurality of electric conductors and a plurality of electrical outlets providing electrical coupling thereto;
    a controller electrically coupled to said electric power distribution network through one of said electrical outlets; and
    an appliance electrically coupled to said electric power distribution network through one of said electrical outlets, said appliance including user-operative controls, security and control logic, a communication interface interposed between said logic and said electric power distribution network, and means for disabling operation of said appliance overriding user input from said user-operative controls, said means being controlled by said logic; and
    wherein said controller transmits individualized information to said appliance via said electric power distribution network, said individualized information being independent of a physical location of said appliance.

2. The system of claim 1, wherein said controller is a personal computer having a controller, a display, a user interface, and a communication module interposed between said controller and said electric power distribution network.

3. The system of claim 1, wherein said controller is a portable unit having a microcontroller, a display, a user interface, and a communication interface interposed between said microcontroller and said electric power distribution network.

4. The system of claim 3, wherein said portable unit further includes a personal computer interface port.

5. The system of claim 1, wherein said appliance includes a unique identification code stored therein, and wherein said individualized information contains an address portion containing said unique identification code.

6. The system of claim 5, wherein said unique identification code is set by a manufacturer of said appliance.

7. The system of claim 1, wherein said appliance includes a security code stored therein, and wherein said individualized information contains said security code to allow operation of said appliance.

8. The system of claim 7, wherein said controller periodically transmits said individualized information containing said security code.

9. The system of claim 8, wherein said security and control logic commands said means to disable operation of said appliance in the absence of receipt of said individualized information containing said security code after a predetermined time.

10. The system of claim 7, wherein said security and control logic commands said means to disable operation of said appliance in the absence of receipt of said individualized information containing said security code after a predetermined time from electric coupling to said electric power distribution network.

11. The system of claim 7, wherein said security and control logic commands said means to enable operation of said appliance upon receipt of said individualized information containing said security code.

12. The system of claim 1, wherein said individualized information contains a control portion, and wherein said logic is responsive to said control portion to control operation of said appliance.

13. The system of claim 12, wherein said controller generates said control portion in response to user commands.

14. The system of claim 12, wherein said controller generates said control portion in response to a user defined operational program.

15. For use in an electronic identification, control, and security system having an electric power distribution network including a plurality of electric conductors and a plurality of electrical outlets providing electrical coupling thereto, a controller electrically coupled to the electric power distribution network through one of the electrical outlets for transmitting individualized information via the electric power distribution network, an appliance, comprising:
    an electric power connector adapted to couple said appliance to the electric power distribution network via an electrical outlet;
    security and control logic;
    a communication interface interposed between said logic and said electric power connector;
    means for enabling and disabling operation of said appliance, said means being controlled by said logic; and
    user-operable controls which provide control input to operate said appliance when said means for enabling and disabling operation has enabled operation of said appliance.

16. The appliance of claim 15, further comprising:
    a unique identification code stored within said appliance; and
    wherein said logic responds only to messages containing said unique identification code.

17. The appliance of claim 15, further comprising:
    a security code stored within said appliance; and
    wherein said logic commands said means to enable operation of said appliance upon receipt of said security code.

18. The appliance of claim 17, wherein said logic commands said means to disable operation of said appliance after a predetermined time from last receipt of said security code.

19. In an electronic identification, control, and security system utilizing an electric power distribution network having a plurality of electric conductors and a plurality of electrical outlets providing electrical coupling thereto, a plurality of appliances electrically coupled to the electric power distribution network through the electrical outlets, at least one of the appliances including security and control logic, a communication interface interposed between the logic and the electric power distribution network, and means for enabling and disabling operation of the at least one appliance controlled by the logic, a portable controller, comprising:

- an electric power connector adapted to couple said controller to the electric power distribution network via an electrical outlet;
- a microcontroller;
- a memory storage device;
- a display;
- a user interface; and
- a communication interface interposed between said microcontroller and said electric power connector; and
- wherein said microcontroller generates individualized information and security code information for transmission by said communication interface to the appliance via the electric power distribution network.

20. The portable controller of claim 19, further comprising a computer interface port.

21. The portable controller of claim 19, wherein said microcontroller generates security code information for transmission by said communication interface to the appliance via the electric power distribution network in response to user input from said user interface.

22. The portable controller of claim 21, wherein said microcontroller periodically generates security code information for transmission by said communication interface to the appliance via the electric power distribution network.

23. The portable controller of claim 19, wherein the at least one appliance includes an unique identification code stored therein, said portable controller storing the unique identification code in said memory storage device, said individualized information including the unique identification code.

24. For use in association with an appliance in an electronic identification, control, and security system having an electric power distribution network including a plurality of electric conductors and a plurality of electrical outlets providing electrical coupling thereto, a controller electrically coupled to the electric power distribution network through one of the electrical outlets for transmitting individualized information via the electric power distribution network, the appliance having an electric power connector adapted to couple the appliance to the electric power distribution network via an electrical outlet, an adapter, comprising:

- an electrical input adapted to connect to an electrical outlet:
- an electrical output adapted to connect to the electrical power connector of an appliance:
- means for electrically coupling said input to said output;
- security and control logic;
- a communication interface electrically coupled to said logic and to said means for electrically coupling;
- data memory storage coupled to said logic for storing unique identification information and security code information; and
- means for enabling and disabling operation of said appliance, said means being controlled by said logic and electrically interposed between said input and said output.

* * * * *